June 20, 1950

C. C. WHITTAKER ET AL 2,512,402

LOCOMOTIVE CONTROL SYSTEM

Filed Feb. 5, 1947

WITNESSES:

INVENTORS
Charles C. Whittaker and
William H. Eunson.
BY
G. M. Crawford
ATTORNEY Patented June 20, 1950

2,512,402

UNITED STATES PATENT OFFICE 2,512,402

LOCOMOTIVE CONTROL SYSTEM

Charles C. Whittaker, Pittsburgh, and William H. Eunson, Wilkinsburg, Pa., assignors to Westinghouse Electric Corporation, East Pittsburgh, Pa., a corporation of Pennsylvania Application February 5, 1947, Serial No. 726,580

3 Claims. (Cl. 318—390)

Our invention relates, generally, to control systems and, more particularly, to systems for controlling the operation of electric locomotives and the like.

It is desirable to protect the traction motors on electric locomotives against overload and it has been the practice to apply overload relays having a given current setting which, when this setting is exceeded, cause the line switches to open, thereby taking power off of the traction motor circuit. This action is undesirable since it causes a surge in the train because of the sudden loss of tractive effort.

Alternating-current motors are designed to operate continuously with a given current at a base voltage and above this with increasing voltages at a substantially constant output up to their maximum designed speed. It has become customary to provide a number of overvoltage notches on locomotives and cars equipped with alternating-current motors. Operating at these voltages, over the base voltage for which a motor is primarily designed, takes advantage of a characteristic of the electromagnetic proportions of the A. C. motor, whereby it is possible, by limiting the power input to the motor, to raise the voltage as the speed rises so as to keep substantially a constant output up to the maximum speed of the vehicle.

The overload relays or current limit relays previously utilized prevent excessive inputs of amperes into the motor circuits up to the base voltage of the motors. However, when the voltage is raised above the base voltage overload relays and current limit relays no longer protect the motors against excessive inputs of power. When the voltage exceeds the base voltage, the current must be reduced proportionately to limit the power input to the motors.

An object of our invention is to provide for controlling the power input to the traction motors of an electric locomotive or other vehicle.

Another object of our invention is to provide for decreasing the motor current during the accelerating cycle for an electric motor.

A further object of our invention is to automatically retard the operation in one direction of the accelerating controller for a motor but permit freedom of operation in the other direction.

Still another object of our invention is to control the progression of the accelerating controller for a motor in accordance with the operating conditions of the motor.

A more general object of our invention is to provide a locomotive control system which shall be simple and efficient in operation and which may be economically manufactured and installed.

Other objects of our invention will be explained fully hereinafter or will be apparent to those skilled in the art.

In accordance with one embodiment of our invention, the power input to the traction motors of a locomotive is limited by automatically controlling the progression of the motor controller by means of a relay which operates on a decreasing amount of current as the motor speed and voltage increase.

For a better understanding of the nature and objects of our invention, reference may be had to the following detailed description, taken in conjunction with the accompanying drawing, in which.

Figure 1:
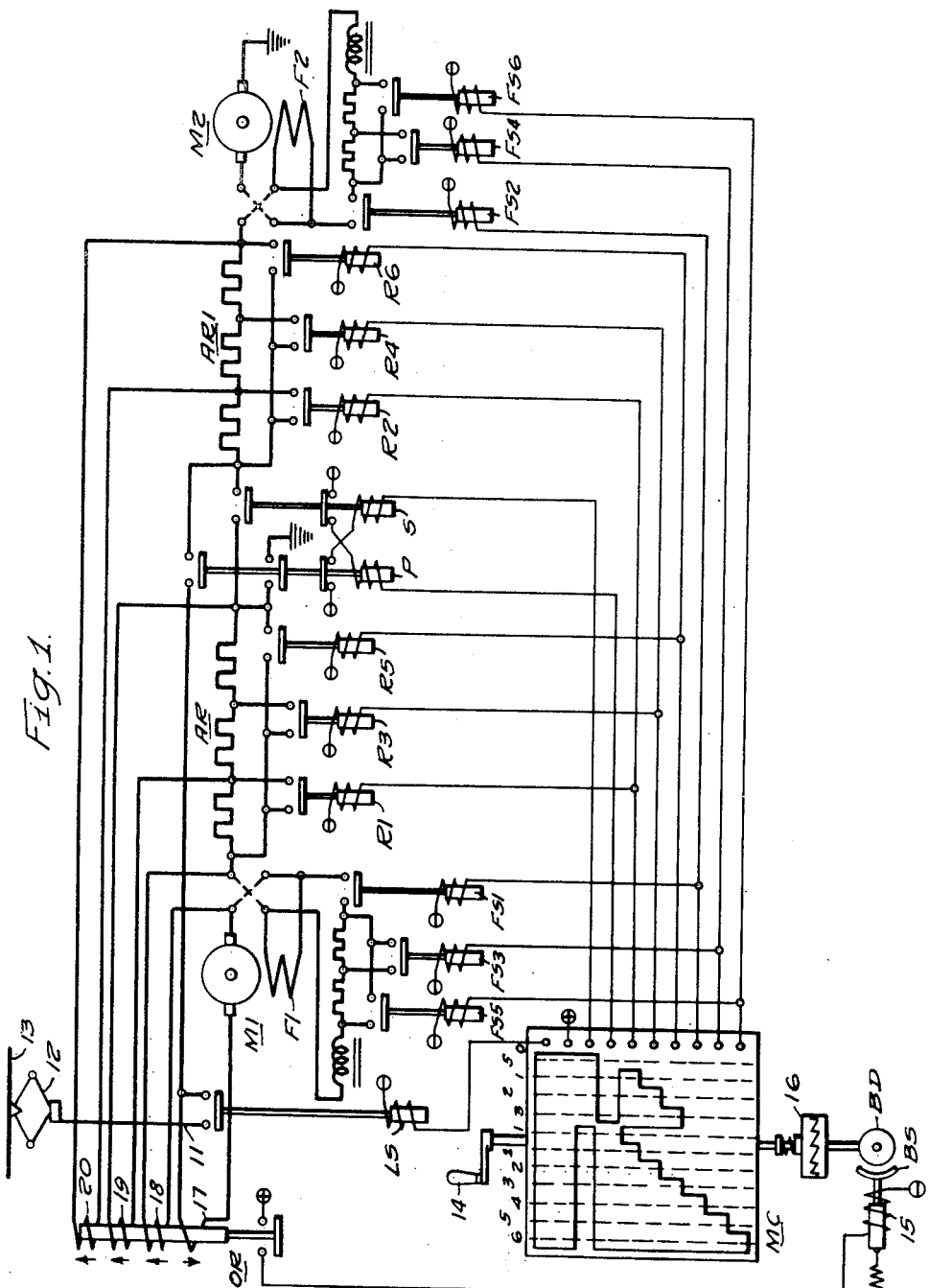
Figure 1 is a diagrammatic view of a direct-current motor control system embodying the principal features of our invention.

Referring to the drawings, and particularly, to Figure 1, the system shown therein comprises a pair of direct-current motors M1 and M2 which may be of a type suitable for propelling an electric locomotive (not shown), a line switch LS for connecting the motors to a power conductor 11 which may be energized through a current collector 12 which engages a trolley conductor 13, a switch S for connecting the motors in series-circuit relation, a switch P for connecting the motors in parallel-circuit relation, and a plurality of resistor shunting switches R1 to R6, inclusive, for shunting resistors AR and AR1 from the motor circuit step-by-step during acceleration of the motors in a manner well known in the art. Field-shunting switches FS1 to FS6, inclusive, may be provided for shunting the field windings F1 and F2 of the motors M1 and M2, respectively, during a portion of the accelerating cycle.

The operation of the foregoing switches may be controlled by a master controller MC which may be of the drum type. As shown, the controller MC is manually operated by means of a handle 14. However, if desired, the controller MC may be operated by a pilot motor or by an air engine of a type well known in the art. Since the operation of control systems of the type shown for controlling the acceleration of electric locomotives is well known in the art, it is believed to be unnecessary to describe the general operation of the system in more detail in the present application.

In order to prevent the operator of the locomotive from overloading the motors by attempting to accelerate too rapidly, provision is made for retarding or stopping the progression of the controller MC by means of a brake drum BD which is connected to the shaft of the controller MC. As shown, the brake drum is engaged by a brake shoe BS when a solenoid coil 15 is energized.

The energization of the solenoid coil 15 is controlled by an overload relay OR which is responsive to the operating conditions of the motors M1 and M2. When the current in the motor circuits exceeds a predetermined amount, the contact members of the relay OR are closed, thereby establishing an energizing circuit for the solenoid coil 15 which actuates the brake shoe BS into engagement with the brake drum BD.

In this manner, the operator is definitely prevented from moving the controller to a higher notch while the contact members of the relay OR are closed. When the traction motor current falls below the setting of the over load relay, the brake on the controller drum is released and the acceleration can proceed.

It will be noted that the controller drum can always be moved backwards towards the "off" position since the shaft of the controller is connected to the brake drum by means of a ratchet device 16. The ratchet 16 is so constructed that it engages the brake drum when the controller shaft is moved toward a higher notch, but releases the brake drum when moving toward a lower notch. Thus, the controller can always be returned toward the "off" position independently of the braking mechanism.

Figure 4:
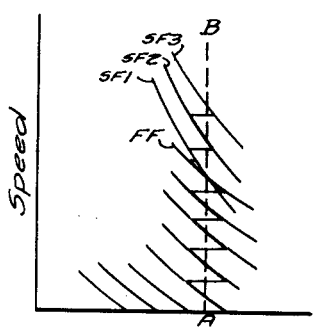

As shown in Figure 4, the usual current limit relay provided for controlling the acceleration of railway motors permits the motors to accelerate on the same average current, as indicated by the line AB. It is actually desirable to accelerate along the line A, C, D, E in Fig. 5, for the reason that the commutation limit of the motors is exceeded in the region C, F, D for the full field running curve FF and in the region F, B, E, D for the shunted field curves SF1, SF2 and SF3. In other words, it is desirable to decrease the average value of the accelerating current as the speed of the motor increases, in order to prevent exceeding the permissible limit of commutation.

The foregoing result may be accomplished with the present system by providing the relay OR with a main series coil 17 and additional coils 18, 19 and 20 which are so disposed on the relay that they oppose the action of the main series coil 17. As shown, the coil 18 is connected across the field winding F1 of the motor M1 and is therefore responsive to the voltage drop across the field winding. The coil 19 is connected across a portion of the accelerating resistor AR and the coil 20 is connected across a portion of the accelerating resistor AR1. Therefore, these coils are responsive to the voltage drops across their respective resistors.

Figure 5:
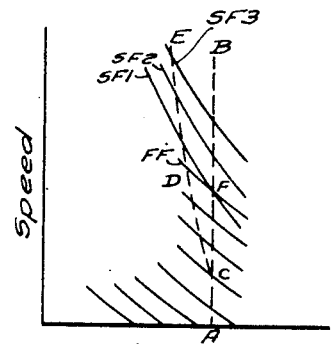

Accordingly, the maximum accelerating current is permitted for the first few notches of the accelerating cycle since the main series coil 17 must overcome the action of all of the bucking coils. When the portions of the accelerating resistors across which the coils 19 and 20 are connected are shunted from the motor circuit, these coils no longer have any effect. Consequently, the contact members of the relay OR are closed by a smaller amount of current and the relay functions to maintain a lower average accelerating current by retarding the advancement of the controller MC. When the field winding F1 is shunted by the field shunting switches, the effect of the bucking coil 18 is decreased thereby still further reducing the amount of current required to close the contact members of the relay OR and stop the controller MC. In this manner, the motors may be caused to accelerate along a line similar to A, C. D, E, as shown in Fig. 5.

Figure 2:
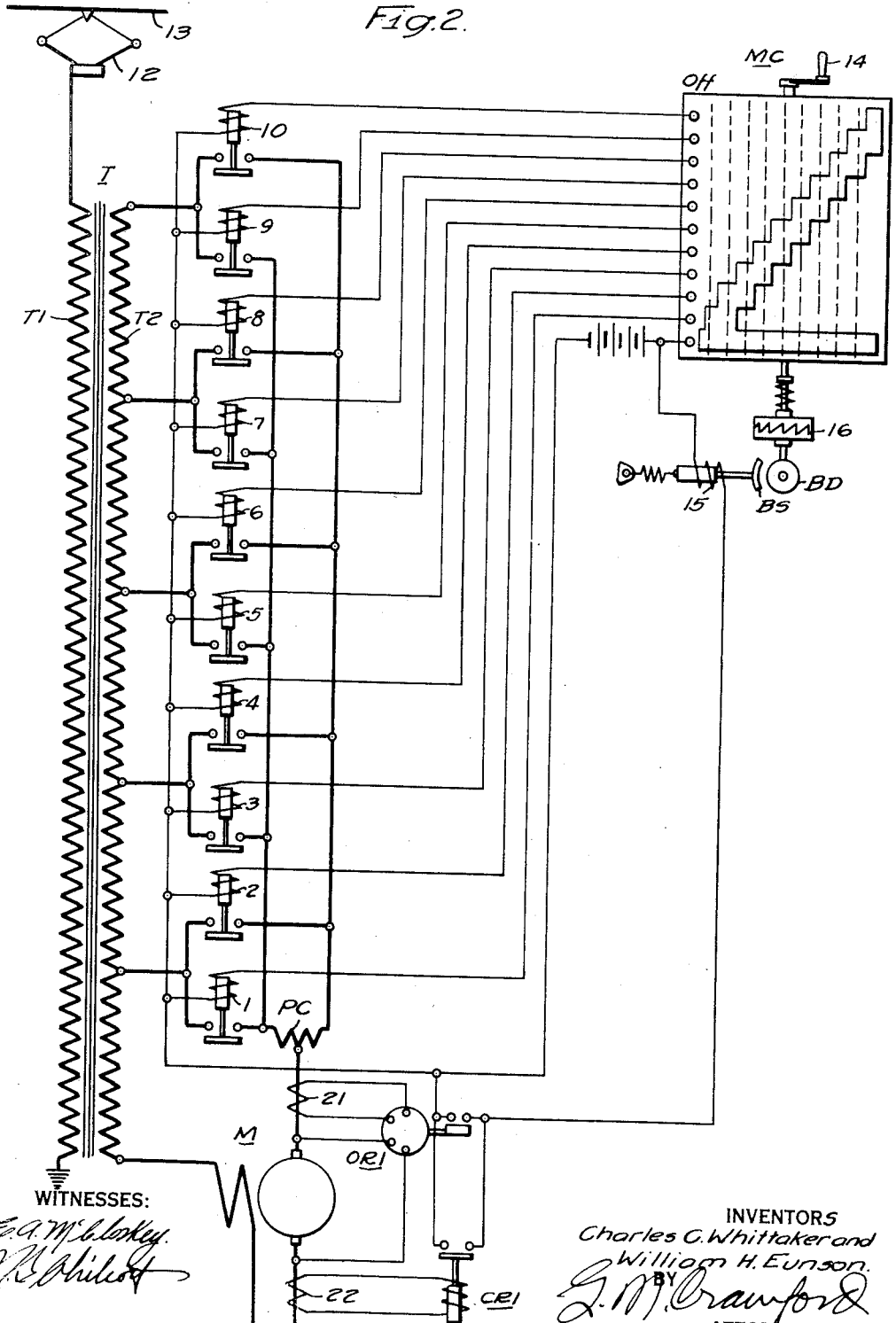
Fig. 2 is a diagrammatic view of an alternating-current motor control system embodying the principal features of our invention.

In the modification of the invention shown in Fig. 2, in which like parts are designated by the same reference characters as in Fig. 1, an alternating-current motor M is provided with power through a transformer T having a primary winding T1 and a secondary winding T2. A plurality of tap-changing switches 1 to 10, inclusive, are provided for connecting the motor M to successive taps on the secondary winding T2, thereby gradually increasing the voltage applied to the motor in a manner well known in the art. A preventive coil PC is provided for preventing the short circuiting of sections of the transformer winding during the operation of the tap-changing switches.

The operation of the tap-changing switches may be controlled by the master controller MC which may be manually operated by the handle 14 or, as previously explained, may be operated by a pilot motor or an air engine. Since the functioning of such control systems is well known in the art, it is believed to be unnecessary to describe the general operation of the present system in more detail.

As explained hereinbefore, it is customary to operate alternating-current motors on locomotives and cars at voltages above the base voltage for which the motors are primarily designed. When operating at such voltages, the usual overload or current limit relays no longer protect the motors against excessive inputs of power. When the voltage exceeds the base, the current must be proportionately reduced in order to limit the actual power input to the motor.

This may be accomplished with the present system by utilizing a current-responsive relay CR1 in conjunction with an overload relay OR1 which is of the watt type. The relay OR1 has one set of terminals connected to a current transformer 21, energized by the motor current, and another set of terminals connected across the armature winding of the motor M1. Accordingly, the relay OR1 is responsive to the actual watts input to the motor. The relay CR1 is connected to a current transformer 22 also energized by the motor current. Thus, the relay CR1 is responsive to the motor current and its setting may be such that it functions to limit the current during the first part of the accelerating cycle.

As shown, the contact members of the relays OR1 and CR1 are connected in parallel and control the energization of the solenoid coil 15 which, as explained hereinbefore, causes the brake shoe BS to engage the brake drum BD to stop the progression of the controller MC. Thus, if the actual power input to the motor exceeds the setting of the delay OR1 or if the motor current exceeds the setting of the relay CR1, the progression of the controller is stopped to prevent a further increase in the voltage applied to the motor.

When the power input decreases below the setting of the relay OR1, the brake is released to permit further progression of the controller. Likewise the brake is released when the current decreases below the setting of the relay CR1. The ratchet device 16 permits the controller to be returned toward the "off" position in the manner hereinbefore described.

Figure 3:
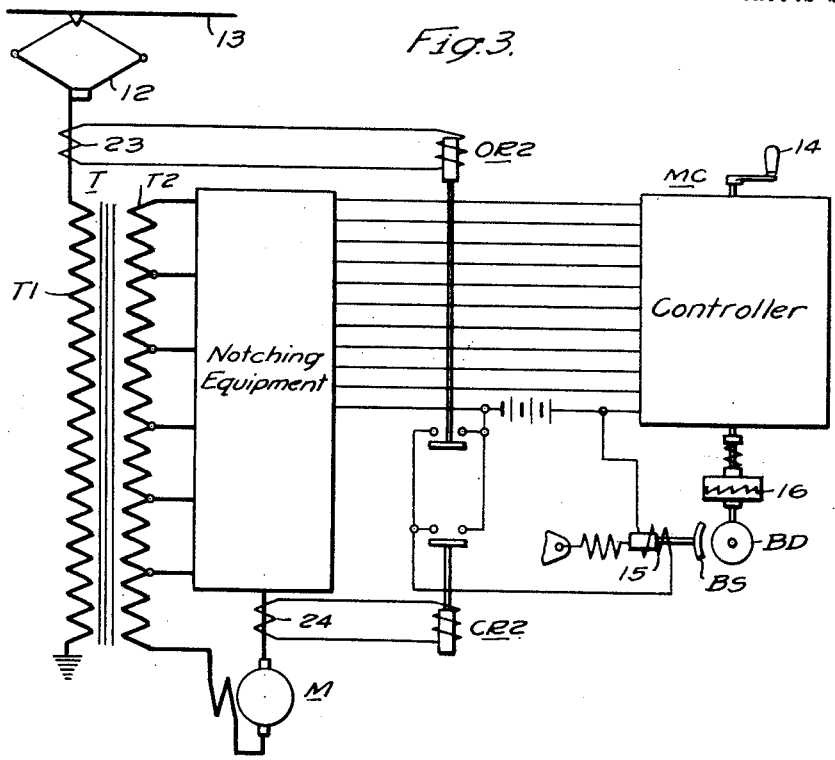
Fig. 3 is a diagrammatic view of a slight modification of the system shown in Fig. 2, and Figs. 4, 5 and 6 are views of curves illustrating the results obtained by utilizing our invention.

The system shown in Fig. 3 is similar to that shown in Fig. 2 with the exception that the actuating coil of the overload relay OR2 is energized by a current transformer 23 which is connected in the circuit for the primary winding T1 of the transformer T. However, the relay OR2 is responsive to the actual power input to the motor M1 since it may be assumed that the trolley voltage is constant and, therefore, a change in the current in the primary winding T1 of the transformer indicates a change in the power input to the motor.

Accordingly, the relay OR2 may be so constructed that it will function to stop the progression of the controller MC, in a manner hereinbefore described, when the actual power input to the motor exceeds a predetermined amount. A relay CR2 is energized by a current transformer 24 and is responsive to the motor current. This relay functions in the same manner as the relay CR1 to limit the accelerating current.

Figure 6:
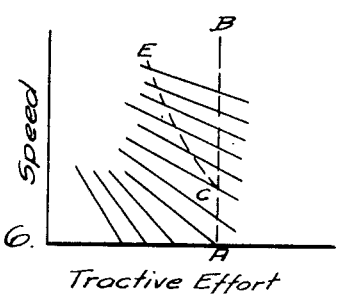

As shown by the performance curves in Fig. 6, the motor may be caused to accelerate along a line A, C, E instead of the line A, C, B by utilizing the system herein described. The current responsive relay has control between the points A and C and the power responsive relay has control between the points C and E. If desired, the two relays may be combined into one relay having elements responsive to current and power.

From the foregoing description, it is apparent that we have provided for actually decreasing the amount of current as the voltage and speed of a motor are increased. In this manner, the motor is protected against damage from overload without the necessity of completely disconnecting the motor from the power source as has been customary in prior systems.

Since numerous changes may be made in the above-described construction and different embodiments of the invention may be made without departing from the spirit and scope thereof, it is intended that all matter contained in the foregoing description or shown in the accompanying drawing shall be considered as illustrative and not in a limiting sense.

We claim as our invention:

1. In a control system, in combination, a motor, a controller for the motor, means for stopping progression of the controller, a relay having a coil responsive to the motor current for controlling the operation of said stopping means, and additional coils on said relay responsive to the progression of the controller for changing the operating characteristics of the relay.

2. In a control system, in combination, a motor, a controller for the motor, means for stopping progression of the controller, a relay responsive to the power input to the motor for controlling the operation of said stopping means, an additional relay responsive to the motor current for also controlling the operation of said stopping means, and means for releasing said controller from said stopping means.

3. In a control system, in combination, an alternating-current motor, a transformer having a primary winding and a secondary winding, switching means for connecting the motor to successive taps on the secondary winding, a controller for controlling the operation of said switching means, means for stopping the progression of said controller, and a relay responsive to the current in the primary winding of the transformer for controlling the operation of said stopping means, and an additional relay responsive to the current in the secondary winding of the transformer for also controlling the operation of said stopping means.

CHARLES C. WHITTAKER.
WILLIAM H. EUNSON.

REFERENCES CITED

The following references are of record in the file of this patent:

UNITED STATES PATENTS

| Number | Name | Date |
|---|---|---|
| 911,029 | Cheney | Feb. 2, 1909 |
| 1,955,319 | Whittaker | Apr. 17, 1934 |
| 2,082,026 | Powers | June 1, 1937 |